United States Patent
Kurabayashi et al.

[11] Patent Number: 5,415,686
[45] Date of Patent: May 16, 1995

[54] INK, INK-JET RECORDING METHOD MAKING USE OF THE SAME AND INSTRUMENT PROVIDED WITH THE INK

[75] Inventors: Yutaka Kurabayashi, Tokorozawa; Mayumi Yamamoto, Tokyo; Shinichi Tochihara, Hadano; Shinichi Sato, Kawasaki, all of Japan

[73] Assignee: Canon Kabushiki Kaisha, Tokyo, Japan

[21] Appl. No.: 222,951

[22] Filed: Apr. 5, 1994

[30] Foreign Application Priority Data

Apr. 7, 1993 [JP] Japan .................. 5-080774

[51] Int. Cl.$^6$ .............................. C09D 11/14
[52] U.S. Cl. ................ 106/26 R; 106/20 C; 106/22 C; 106/22 F
[58] Field of Search ............ 106/26 R, 20 C, 22 C, 106/22 F

[56] References Cited

U.S. PATENT DOCUMENTS

| | | | |
|---|---|---|---|
| 4,192,841 | 3/1980 | Robertson et al. | 106/26 R |
| 4,923,515 | 5/1990 | Koike et al. | 106/22 |
| 4,990,186 | 2/1991 | Jones et al. | 106/26 R |
| 5,078,790 | 1/1992 | Tochihara et al. | 106/20 |
| 5,080,716 | 1/1992 | Aoki et al. | 106/20 |
| 5,082,496 | 1/1992 | Yamamoto et al. | 106/22 |
| 5,101,217 | 3/1992 | Iwata et al. | 346/1.1 |
| 5,123,960 | 6/1992 | Shirota et al. | 106/22 |
| 5,125,969 | 6/1992 | Nishiwaki et al. | 106/22 |
| 5,127,946 | 7/1992 | Eida et al. | 106/22 |
| 5,130,723 | 7/1992 | Yamamoto et al. | 346/1.1 |
| 5,131,949 | 7/1992 | Tochihara et al. | 106/20 |
| 5,132,700 | 7/1992 | Tochihara et al. | 346/1.1 |
| 5,133,803 | 7/1992 | Moffatt | 106/25 |
| 5,135,571 | 8/1992 | Shirota et al. | 106/22 |
| 5,137,570 | 8/1992 | Nishiwaki et al. | 106/22 |
| 5,167,703 | 12/1992 | Eida et al. | 106/22 K |
| 5,178,671 | 1/1993 | Yamamoto et al. | 106/22 K |
| 5,213,613 | 5/1993 | Nagashima et al. | 106/20 R |
| 5,213,614 | 5/1993 | Eida et al. | 106/22 K |
| 5,215,577 | 6/1993 | Eida et al. | 106/22 K |
| 5,215,578 | 6/1993 | Eida et al. | 106/22 K |
| 5,256,194 | 10/1993 | Nishiwaki et al. | 106/22 K |
| 5,258,066 | 11/1993 | Kobayashi et al. | 106/22 R |
| 5,258,505 | 11/1993 | Eida et al. | 534/680 |
| 5,296,022 | 3/1994 | Kobayashi et al. | 106/20 D |
| 5,314,531 | 5/1994 | Huber et al. | 106/26 R |

FOREIGN PATENT DOCUMENTS

| | | |
|---|---|---|
| 55-65269 | 5/1980 | Japan . |
| 55-66976 | 5/1980 | Japan . |
| 58-13675 | 1/1983 | Japan . |
| 61-59911 | 12/1986 | Japan . |
| 61-59912 | 12/1986 | Japan . |
| 61-59914 | 12/1986 | Japan . |
| 3172362 | 7/1991 | Japan . |
| 171094 | 7/1993 | Japan . |

OTHER PUBLICATIONS

Dialog Abstract of JP05/171094, Jul. 1993.
Derwent Abstract (WPI) No. 92-203862 with respect to Japanese Patent Document No. 4-132774 (Sep. 26, 1990).

*Primary Examiner*—Helene Klemanski
*Attorney, Agent, or Firm*—Fitzpatrick, Cella, Harper & Scinto

[57] ABSTRACT

Disclosed herein is an ink comprising a recording agent and a liquid medium dispersing or dissolving the recording agent therein, wherein a finely particulate cellulose derivative is dispersed in the ink.

12 Claims, 3 Drawing Sheets

INK, INK-JET RECORDING METHOD MAKING USE OF THE SAME AND INSTRUMENT PROVIDED WITH THE INK

BACKGROUND OF THE INVENTION

1. Field of the Invention

The present invention relates to an ink, in particular, an ink suitable for use in ink-jet recording, a recording method making use of such an ink and instruments including ink-jet recording apparatus making use of such an ink.

2. Related Background Art

An ink-jet recording system is a method in which recording is conducted by flying out droplets of an ink to apply the droplets to a recording material such as paper. In particular, according to the methods disclosed in Japanese Patent Publication Nos. 61-59911, 61-59912 and 61-59914 by the present applicant, in which an electrothermal converter is used as an ejection-energy supply means to apply thermal energy to an ink so as to generate bubbles, thereby ejecting out droplets of the ink, formation of a high-density multi-orifice in a recording head can be realized with ease, and high-resolution and high-quality images can be recorded at high speed.

Of image-forming processes according to such an ink-jet recording system, a technique which has especially acquired an importance in recent years is an image-forming process which permits highly fine, full-color recording, which is good in coloring and free of any leathering or bleeding, even on non-coated paper such as paper for electrophotography, paper for reporting, notepaper, letter paper, bond paper and continuous business forms (these will hereinafter be called "plain paper" collectively), which are commonly used in offices and homes. The design of ink is one of important points for achieving such a technique.

However, the conventional inks used in ink-jet recording generally comprise, as a principal component, water, and include additionally a water-soluble high boiling solvent such as glycol for the purpose of preventing drying and clogging, and the like. When such an ink has been used to conduct recording on plain paper, there have been disadvantages that the ink penetrates into the interior of the recording paper, resulting in failure to obtain images having sufficient color depth, and moreover, unevenness of color strength occurs on images, which appears to be attributed to the uneven distribution of the filler and size on the surface of the recording paper. In particular, when a color image is intended to form, plural inks of different colors are overlapped one after another before the time required to fix the inks goes on. Therefore, color bleeding and uneven color mixing have occurred at portions of boundaries between different colors in the resulting image (hereinafter referred to as "bleeding" simply), resulting in failure to obtain a satisfactory image.

Japanese Patent Application Laid-Open No. 55-65269 discloses the use of inks added with a compound capable of enhancing their penetrability, such as a surfactant, and Japanese Patent Application Laid-Open No. 55-66976 discloses the use of inks comprising, as a principal component, a volatile solvent. It is also disclosed in Japanese Patent Application Laid-Open No. 55-57862 to add a strongly basic substance to an ink so as to chemically dissolve a size and pulp contained in a paper sheet, thereby controlling the spreading of dots and the easiness of absorption. Further, Japanese Patent Application Laid-Open No. 58-13675 discloses the addition of polyvinyl pyrrolidone having a molecular weight not lower than 40,000 to an ink, or Japanese Patent Application Laid-Open No. 3-172362 discloses a method of controlling the spreading of dots and the easiness of absorption by adding a specific microemulsion to an ink.

However, the above-mentioned prior art techniques have involved such problems as described below.

The method of enhancing the penetrability of an ink into the interior of paper by the addition of a surfactant can improve the fixing ability of the ink, but involves a problem that since a recording agent also penetrates deeply, the coloring ability of the ink is lowered. In addition, since the wettability to the surface of the recording paper is also improved, the ink tends to spread, resulting in reduction of resolution and occurrence of featbering. Such a method has not hence been preferred. Further, if a volatile solvent is used in an ink, the evaporation rate of the solvent on recording paper is actually lower than the rate of the occurrence of bleeding. Therefore, the bleeding cannot be completely prevented under circumstances. In addition, such an ink is liable to cause clogging due to the evaporation of the solvent in a nozzle of a recording head. The method has not also been preferred from the viewpoint of long-term reliability on these points.

The method in which a strongly basic substance is added to an ink is insufficient to solve problems of both featbering and fixing ability against paper making use of a certain size, for example, neutralized paper, and also has a problem of safety for human body. Further, the mere addition of a polymer or a certain emulsion to an ink fails to exhibit sufficient effects in such a range that the recording density of the ink becomes greater upon full-color recording or the like.

As a problem involved in the prior art, may be mentioned the following suitability of ink for recording on plain paper in addition to the above-described problems. Namely, there are a wide variety of kinds in paper sheets collectively called the plain paper. It may safely be said that their factors such as ink adsorptiveness, surface smoothness, the kind, thickness and length of pulp fibers, and the distribution of various additives such as a surface size and an internal size on the surface thereof, which are considered to participate in suitability for ink-jet recording, all differ between different kinds of paper. As a result, there has been a problem that quality of character such as degree of featbering, evenness of solid printed areas, ink fixing ability, degree of bleeding on color images, and the like greatly vary according to the kind of paper.

SUMMARY OF THE INVENTION

The present invention has been completed with the foregoing circumstances in view and has as an object the provision of an ink, which even in recording on plain paper, can give good quality of character while retaining good fixing ability, provide images sufficient in color depth and high in evenness of color strength and in particular, form images high in image quality in which bleeding in a color image is prevented, color reproductivity is good and the images are bright and even, and an ink-jet recording method making use of such an ink and instruments provided with such an ink. It is another object of the present invention to lessen the difference in suitability for ink-jet recording between different kinds of paper as much as possible.

The above objects can be achieved by the present invention described below.

According to the present invention, there is thus provided an ink comprising a recording agent and a liquid medium dispersing or dissolving the recording agent therein, wherein a finely particulate cellulose derivative is dispersed in the ink.

In the ink according to the present invention, the finely particulate cellulose derivative may preferably have a particle size distribution ranging from 0.01 μm to 10 μm. The finely particulate cellulose derivative may preferably be porous. The recording agent may preferably be a water-soluble dye or a pigment.

According to the present invention, there is also provided an ink-jet recording method in which droplets of an ink are ejected out from an orifice in accordance with a recording signal to make a record on a recording material, wherein said ink used is the ink described above.

According to the present invention, there is further provided a recording unit comprising an ink container portion with an ink held therein and a head from which the ink is ejected in the form of ink droplets, wherein said ink is the ink described above.

According to the present invention, there is still further provided an ink-jet recording apparatus comprising a recording head from which an ink is ejected in the form of ink droplets, an ink cartridge having an ink container portion with an ink held therein, and an ink feeder for feeding the ink from the ink cartridge to the recording head, wherein said ink is the ink described above.

DESCRIPTION OF THE PREFERRED EMBODIMENTS

The finely particulate cellulose derivative described in the present invention means that obtained by subjecting natural cellulose or various water-insoluble cellulose derivatives derived from the natural cellulose to a proper pretreatment and then pulverizing the cellulose or cellulose derivatives. As the finely particulate cellulose derivative, may preferably be used those having a particle size distribution between 0.01 μm and 10 μm in terms of particle size as determined by the laser scattering method. Besides, with respect to its average particle size, those having a particle size ranging from 0.05 μm to 5 μm, preferably from 0.1 μm to 3 μm may be preferably used.

The first effect brought about by using the finely particulate cellulose derivative to disperse it in an ink-jet ink is that since the cellulose derivative having high affinity for pulp making up recording paper exists in the form of fine particles, it tends to remain on pulp fibers in the course of penetration of the ink into the recording paper. As a result, it is considered that the smoothness of the recording paper is enhanced in the vicinity of its surface, and irregular reflection is hence lessened, resulting in improvement in the reflection density and color saturation of a recorded image. It is considered that an effect of making up the difference in suitability for ink-jet recording between recording paper sheets different in surface profile is further produced from such an effect of the finely particulate cellulose derivative, by which the irregularities of the recording paper are smoothed to improve its smoothness. Secondly, it is considered that since the finely particulate cellulose derivative greatly interacts with pulp fibers making up the recording paper, the thixotropic property of the ink is more increased in the course of penetration of the ink into the recording paper than an ink containing no finely particulate cellulose derivative, so that even if inks of different colors are shot adjoining each other, mixing of the inks is prevented, and so bleeding is suppressed.

The features of the present invention will hereinafter be described in detail by preferred embodiments.

The ink according to the present invention basically comprises a recording agent, a liquid medium dispersing or dissolving the recording agent therein and the finely particulate cellulose derivative described above.

Examples of the recording agents usable in the ink according to the present invention include direct dyes, acid dyes, food colors, basic dyes, reactive dyes, disperse dyes, vat dyes, soluble vat dyes, reactive disperse dyes, oil colors and various pigments.

The content of these recording agents may be determined depending upon the kinds of the liquid medium components, properties required of the ink, and the like. However, they may be generally used in a proportion of from 0.2 to 20% by weight, preferably from 0.5 to 10% by weight, more preferably from 1 to 5% by weight, based on the total weight of the ink.

The liquid medium used in the ink according to the present invention comprises water and at least one water-soluble organic solvent.

Examples of organic solvents usable in the present invention include alcohols such as methyl alcohol, ethyl alcohol, n-propyl alcohol, isopropyl alcohol, n-butyl alcohol, sec-butyl alcohol, tert-butyl alcohol, isobutyl alcohol, n-pentanol and cyclohexanol; amides such as dimethylformamide and dimethylacetamide; ketones and ketoalcohols such as acetone and diacetone alcohol; ethers such as tetrahydrofuran and dioxane; addition polymers of oxyethylene or oxypropylene with diethylene glycol, triethylene glycol, tetraethylene glycol, dipropylene glycol, tripropylene glycol, polyethylene glycol, polypropylene glycol and the like; alkylene glycols such as ethylene glycol, propylene glycol, trimethylene glycol, butylene glycol and hexylene glycol; thiodiglycol; 1,2,6-hexanetriol; glycerol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; sulfolane; N-methyl-2-pyrrolidone; and 1,3-dimethyl-2-imidazolidinone.

The content of the above-mentioned organic solvents is generally within a range of from 1 to 50% by weight, preferably from 2 to 30% by weight based on the total weight of the ink.

The organic solvents as described above may be used either singly or in any combination thereof. However, the most preferred composition of the liquid medium is a mixed solvent comprising water and at least one organic solvent, and containing at least one water-soluble, high-boiling solvent, for example, a polyhydric alcohol such as diethylene glycol, triethylene glycol or glycerol.

The finely particulate cellulose derivative described in the present invention is as described above. As the finely particulate cellulose derivative, may preferably be used those having a particle size distribution between 0.01 $\mu$m and 10 $\mu$m in terms of particle size as determined by the laser scattering method. Besides, with respect to its average particle size, those having a particle size ranging from 0.05 $\mu$m to 5 $\mu$m, preferably from 0.1 $\mu$m to 3 $\mu$m may be preferably used.

The content of such a finely particulate cellulose derivative in the ink is within a range of from 0.1 to 10 by weight, preferably from 0.1 to 5% by weight based on the total weight of the ink.

With respect to the surface profile of the finely particulate cellulose derivative, it may be smooth, but preferably be porous. When it is porous, the recording agent becomes easy to enter pores of the fine particles. In addition to the effect of smoothing the surface of the recording paper, which is one of the effects brought about by the finely particulate cellulose derivative, the recording agent entered in the fine particles in the vicinity of the surface of the paper therefore contributes to the improvement of coloring ability. As a result color depth of the resulting image and coloring ability are more enhanced.

Although the principal components which constitute the ink according to the present invention are as described above, the ink may contain, as needed, a variety of other additives such as dispersants, surfactants, viscosity modifiers, surface tension modifiers, optical whitening agents, antioxidants, mildewproofing agents and pH adjustors and the like within limits not impeding the achievement of the objects of the present invention.

Although the ink according to the present invention may be suitably used in all of ink-jet recording systems generally used, it is particularly suitable for use in an ink-jet recording system of a type that an ink is ejected by the bubbling phenomenon of the ink caused by thermal energy.

Figure 1:
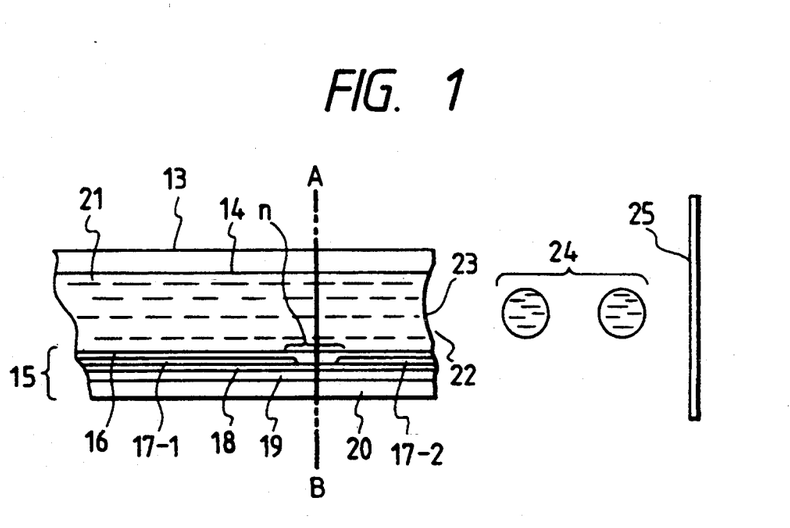
FIG. 1 is a longitudinal cross-sectional view of a head of an ink-jet recording apparatus.
Figure 2:
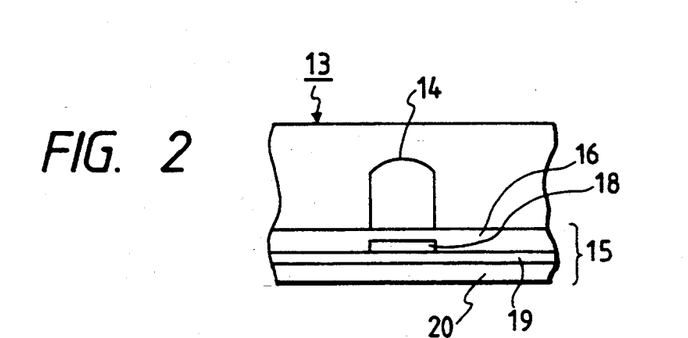
FIG. 2 is a transverse cross-sectional view of the head of the ink-jet recording apparatus taken along line A-B of FIG. 1.
Figure 3:
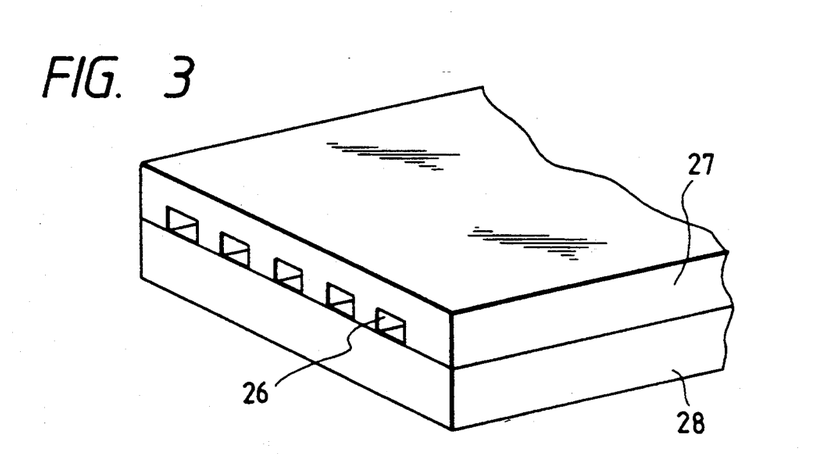
FIG. 3 is a perspective view of the appearance of another head of the ink-jet recording apparatus.

The recording method and instruments including recording apparatus according to the present invention will then be described. The recording apparatus according to the present invention is of a system that a recording signal is applied to an ink within a recording head, and ink droplets are ejected by thermal energy generated. Examples of the construction of a recording head, which is a main component of such an apparatus, are illustrated in FIGS. 1, 2 and 3.

A head 13 is formed by bonding a glass, ceramic or plastic plate or the like, in which an ink flow path has been formed in advance, to a heating head 15, which is used for thermal recording and has a heating resistor (the drawing shows a head to which, however, is not limited). The heating head 15 is composed of a protective film 16 made of silicon oxide or the like, aluminum electrodes 17-1 and 17-2, a heating resistor layer 18 made of nichrome or the like, a heat accumulating layer 19, and a substrate 20 made of alumina or the like having a good heat radiating property.

A recording ink 21 comes up to an ejection orifice 22 and forms a meniscus 23 owing to a pressure P.

Now, upon application of electric signals to the electrodes 17-1 and 17-2, the heating head 15 rapidly generates heat at the region shown by n to form bubbles in the ink 21 which is in contact with this region. The meniscus 23 of the ink is projected by the action of the pressure thus produced, and the ink 21 is ejected from the orifice 22 to a recording material 25 in the form of recording droplets 24. FIG. 3 illustrates an appearance of a multi-head composed of an array of a number of heads as shown in FIG. 1. The multi-head is formed by closely bonding a glass plate 27 with a number of flow paths 26 formed therein to a heating head 28 similar to the head as illustrated in FIG. 1.

Incidentally, FIG. 1 is a cross-sectional view of the head 13 taken along the flow path of the ink, and FIG. 2 is a cross-sectional view taken along line A–B of FIG. 1.

Figure 4:
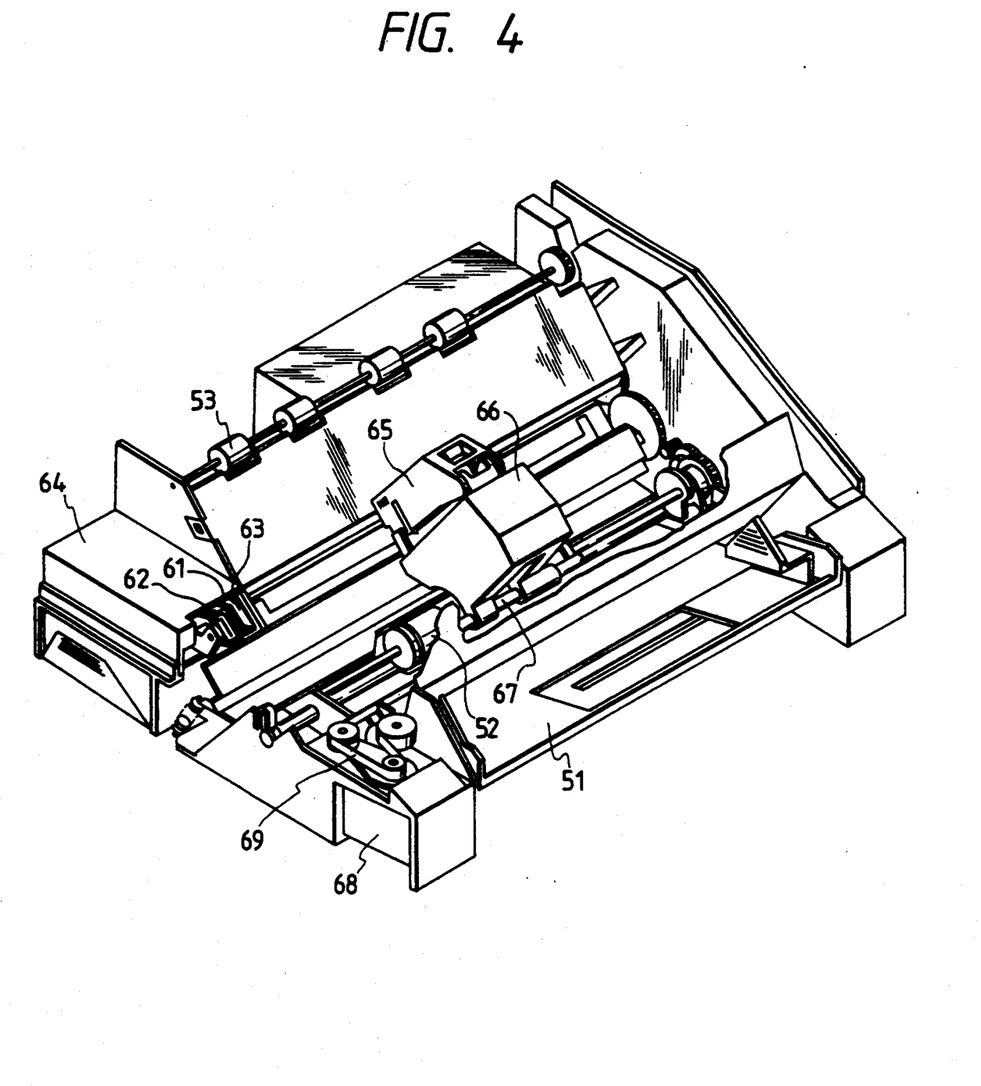
FIG. 4 is a perspective view of an illustrative ink-jet recording apparatus.

FIG. 4 illustrates an example of an ink-jet recording apparatus in which such a head has been incorporated.

In FIG. 4, reference numeral 61 designates a blade serving as a wiping member, one end of which is a stationary end held by a blade-holding member to form a cantilever. The blade 61 is provided at a position adjacent to a region in which a recording head operates, and in this embodiment, is held in such a form that it protrudes to the course through which the recording head is moved. Reference numeral 62 indicates a cap, which is provided at a home position adjacent to the blade 61, and is so constituted that it moves in a direction perpendicular to a direction in which the recording head is moved and comes into contact with the face of ejection openings to cap it. Reference numeral 63 denotes an ink-absorbing member provided adjoiningly to the blade 61 and, similar to the blade 61, held in such a form that it protrudes to the course through which the recording head is moved. The above-described blade 61, cap 62 and absorbing member 63 constitute an ejection-recovery portion 64 for the recording head, where the blade 61 and the absorbing member 63 remove off water, dust and/or the like from the face of the ink-ejecting openings.

Reference numeral 65 designates the recording head having an ejection-energy-generating means and serving to eject the ink onto a recording material set in an opposing relation with the ejection opening face provided with ejection openings to conduct recording. Reference numeral 66 indicates a carriage on which the recording head 65 is mounted so that the recording head 65 can be moved. The carriage 66 is slidably interlocked with a guide rod 67 and is connected (not illustrated) at its part to a belt 69 driven by a motor 68. Thus, the carriage 66 can be moved along the guide rod 67 and hence, the recording head 65 can be moved from a recording region to a region adjacent thereto.

Reference numerals 51 and 52 denote a paper feeding part from which the recording materials are separately inserted, and paper feed rollers driven by a motor (not illustrated), respectively. With such construction, the recording material is fed to the position opposite to the ejection opening face of the recording head, and discharged from a paper discharge section provided with paper discharge rollers 53 with the progress of recording.

In the above constitution, the cap 62 in the head recovery portion 64 is receded from the moving course of the recording head 65 when the recording head 65 is returned to its home position, for example, after completion of recording, and the blade 61 remains protruded to the moving course. As a result, the ejection opening face of the recording head 65 is wiped. When the cap 62 comes into contact with the ejection opening face of the recording head 65 to cap it, the cap 62 is moved so as to protrude to the moving course of the recording head.

When the recording head 65 is moved from its home position to the position at which recording is started, the cap 62 and the blade 61 are at the same positions as the positions upon the wiping as described above. As a result, the ejection opening face of the recording head 65 is also wiped at the time of this movement.

The above movement of the recording head to its home position is made not only when the recording is completed or the recording head is recovered for ejection, but also when the recording head is moved between recording regions for the purpose of recording, during which it is moved to the home position adjacent to each recording region at given intervals, where the ejection opening face is wiped in accordance with this movement.

Figure 5:
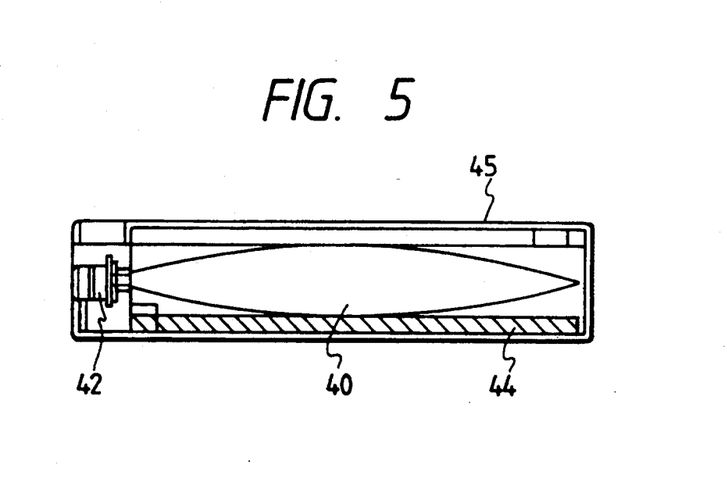
FIG. 5 is a longitudinal cross-sectional view of an ink cartridge.

FIG. 5 illustrates an exemplary ink cartridge in which an ink to be fed to the head through an ink-feeding member, for example, a tube is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink.

It is preferred that the ink container portion be formed of a polyolefin, in particular, polyethylene, at its surface with which the ink comes into contact.

The ink-jet recording apparatus used in the present invention may not be limited to the apparatus as described above in which the head and the ink cartridge are separately provided. Therefore, a device in which these members are integrally formed as shown in FIG. 6 can also be preferably used.

Figure 6:
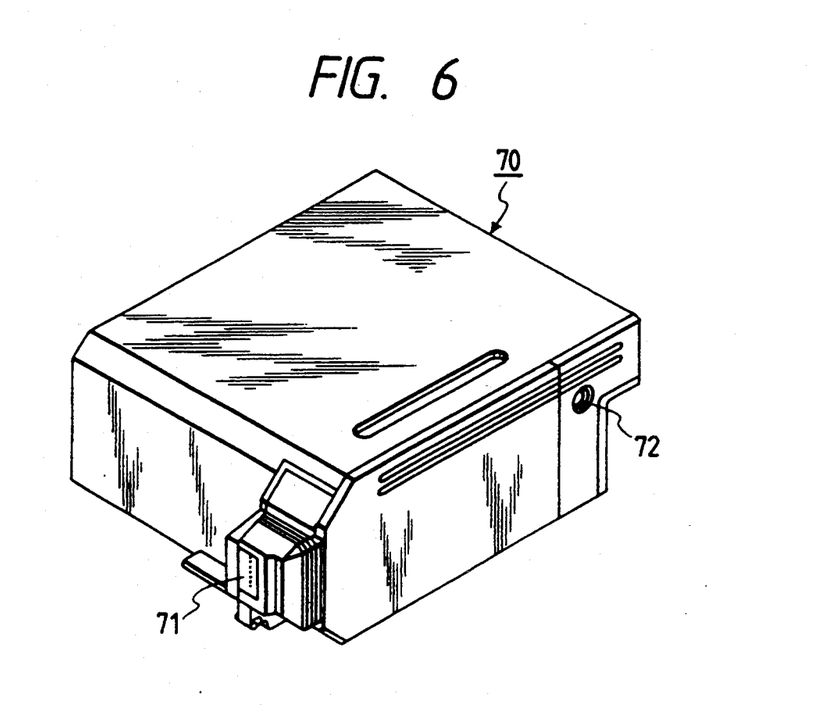
FIG. 6 is a perspective view of a recording unit.

In FIG. 6, reference numeral 70 designates a recording unit, in the interior of which an ink container portion containing an ink, for example, an ink-absorbing member, is contained. The recording unit 70 is so constructed that the ink in such an ink-absorbing member is ejected in the form of ink droplets through a head 71 having a plurality of orifices. For example, polyurethane may be used as the ink-absorbing member. Reference numeral 72 indicates an air passage for communicating the interior of the recording unit 70 with the atmosphere. This recording unit 70 can be used in place of the recording head shown in FIG. 4, and is detachably installed on the carriage 66. Incidentally, in the recording apparatus used in the present invention, the ink-jet recording apparatus in which heat energy is caused to act on an ink to eject out droplets of the ink has been described by way of example. However, the present invention can also be used in other ink-jet recording apparatus such as a piezo-system making use of a piezoelectric element.

The present invention will hereinafter be described more specifically by the following Examples and Comparative Example. Incidentally, all designations of "part" or "parts" and "%" as will be used in the following examples mean part or parts by weight and % by weight unless expressly noted.

EXAMPLE 1

The corresponding component shown below were mixed into solutions, respectively, to prepare a set of inks (1) of yellow, magenta, cyan and black colors.

| [Composition of yellow ink (1)] | |
| --- | --- |
| C.I. Direct Yellow 86 | 2.0 parts |
| Finely particulate cellulose derivative [solids concentration: 12.5%; obtained by classifying Cell Cream EF-7 type (product of Asahi Chemical Industry Co., Ltd.) to a maximum particle size of 3 μm and an average particle size of 0.7 μm] | 8.0 parts |
| Diethylene glycol | 15.0 parts |
| Isopropyl alcohol | 2.5 parts |
| Surfactant [Carpole MH-50, product of Asahi Denka Kogyo K.K.; polyoxyethylene (10) polyoxypropylene (7) butyl ether] | 0.5 part |
| Water | 72.0 parts. |

Composition of magenta ink (1)

The same composition as that of the yellow ink (1) except that the dye of the yellow ink (1) was changed to 2.5 parts of C.I. Acid Red 289, and the amount of water was adjusted so as to amount to 100 parts.

Composition of cyan ink (1)

The same composition as that of the yellow ink (1) except that the dye of the yellow ink (1) was changed to 3.5 parts of C.I. Acid Blue 9, and the amount of water was adjusted so as to amount to 100 parts.

Composition of black ink (1)

The same composition as that of the yellow ink (1) except that the dye of the yellow ink (1) was changed to 3.5 parts of C.I. Food Black 2, and the amount of water was adjusted so as to amount to 100 parts.

Using the inks thus prepared, ink-jet recording was conducted in the following manner to evaluate their suitability for recording in a manner described below.

EXAMPLE 2

A set of inks (2) of yellow, magenta, cyan and black colors respectively having the same compositions as those prepared in Example 1 except that the finely particulate cellulose derivative was changed to that obtained by further pulverizing a porous finely particulate cellulose derivative, RC Beads U-type (product of Nisshinbo Industries, Inc., functional cellulose, particle size distribution: 1 to 12 μm, average particle size: 7 μm) to a particle size distribution of 1 to 8 μm and an average particle size of 4 μm was prepared in the same manner as in Example 1.

Ink-jet recording was conducted in the same manner as in Example 1, and the suitability for recording of the inks was evaluated in a manner described below.

EXAMPLE 3

A pigment ink (3) of a black color was prepared in the following manner.

| [Preparation of pigment dispersion] | |
|---|---|
| Styrene-acrylic acid-butyl acrylate copolymer (acid value: 116, weight average molecular weight: 3700) | 1.5 parts |
| Monoethanolamine | 1 part |
| Diethylene glycol | 5 parts |
| Water | 81.5 parts. |

The above components were mixed and heated to 70° C. in a water bath to completely dissolve the resin therein. To this solution, 10 parts of carbon black (MCF 88, product of Mitsubishi Chemical Industries Limited) and 1 part of isopropyl alcohol, which had been provided separately, were added to premix them for 30 minutes. Thereafter, the resulting premix was subjected for 3 hours to a dispersion treatment making use of zirconium beads having a particle size of 1 mm. The dispersion was further subjected to a centrifugal treatment (12,000 rpm, minutes) to remove coarse particles into a dispersion.

| [Preparation of black ink (3)] | |
|---|---|
| Dispersion described above | 10 parts |
| Finely particulate cellulose (solids concentration: 12.5%; Cell Cream EF-7 type, product of Asahi Chemical Industry Co., Ltd.) | 8.0 parts |
| Surfactant [Carpole MH-50, product of Asahi Denka Kogyo K.K.; polyoxyethylene (10) polyoxypropylene (7) butyl ether] | 0.5 part |
| Glycerol | 3 parts |
| Diethylene glycol | 12 parts |
| N-Methylpyrrolidone | 7 parts |
| Isopropyl alcohol | 3 parts |
| Deionized water | 56.5 parts. |

The above components were mixed and adjusted with monoethanolamine to keep pH 8 to 10, thereby preparing a black ink (3).

Ink-jet recording was conducted in the same manner as in Example 1, and the suitability for recording of the ink was evaluated in a manner described below.

EXAMPLE 4

A black ink (4) having the same composition as that prepared in Example 3 except that the finely particulate cellulose derivative was changed to the same porous finely particulate cellulose derivative as that used in Example 2 was prepared.

Ink-jet recording was conducted in the same manner as in Example 3, and the suitability for recording of the ink was evaluated in a manner described below.

Comparative Example 1

Respective inks having the same composition as those prepared in Example 1 except that the finely particulate cellulose was omitted, and instead water was supplied were prepared in the same manner as in Example 1.

Ink-jet recording was conducted in the same manner as in Example 1, and the suitability for recording of the inks was evaluated in a manner described below.

[Ink-jet recording process and evaluation method of suitability for recording]

An ink-jet printer in which 4 thermal ink-jet recording heads each having 256 nozzles in 400 dpi were aligned in a main scanning direction was provided, and the respective inks, which had been prepared in the above-described manner, were charged in their corresponding recording heads through respective ink-feeding tubes to conduct ink-jet recording on commercially-available bond paper and Xerox 4024 paper. The shot-in ink quantity of a full-solid printed area was 8 nl/mm$^2$ in each color.

Color density of record

After solid prints were recorded with the respective black inks on the above-described paper sheets, and the resulting records were left over for 1 hour, their color density was determined by a Macbeth RD915 (Trade name; manufactured by Macbeth Company) and ranked in accordance with the following standard:

A: Color density was higher than 1.2;
B: Color density was 1.15 to 1.2; and
C: Color density was lower than 1.15.

Fixing ability

Overlap printing was conducted with the respective yellow and magenta inks on the above-described paper sheets. After the printing, each printed area was rubbed with a finger to determine the time until the image became free from running. The fixing ability was ranked as A where no running occurred within 20 seconds or shorter.

Quality of character

English characters and numerals were printed with each black ink on the above-described paper sheets to visually evaluate its quality of character. The quality of character was ranked as A where featbering was inconspicuous.

Resistance to bleeding

Solid prints of the respective inks of yellow, magenta, cyan and black colors were recorded in contiguity with one another on the above-described paper sheets to observe whether color bleeding and/or uneven color mixing occurred at boundary areas between the respective inks or not. The resistance to bleeding was ranked in accordance with the following standard:

A: Neither color bleeding nor uneven color mixing occurred;
B: Color bleeding and/or uneven color mixing occurred to a slight extent, which would cause no problem in actual use; and
C: Color bleeding and uneven color mixing occurred, which would cause problems in actual use.

The results of the evaluation are shown in Table 1. As apparent from the results in Table 1, the inks according to Examples 1 to 4 could provide record images good in all of fixing ability, quality of character, color density and resistance to bleeding.

TABLE 1

| Example No. | Color density | Fixing ability | Quality of character | Resistance to feathering |
|---|---|---|---|---|
| 1 | A | A | A | A |
| 2 | A | A | A | A |
| 3 | A | A* | A | A** |
| 4 | A | A* | A | A** |
| Comp. | B | A | A | C |

TABLE 1-continued

| Example No. | Color density | Fixing ability | Quality of character | Resistance to feathering |
| --- | --- | --- | --- | --- |
| Ex. 1 | | | | |

Note:
*The evaluation of the fixing ability in Examples 3 and 4 was conducted in the same manner as in the other examples except that each of the inks (3) and (4) was shot in an amount corresponding to 200% of each ink in the other examples.
**The evaluation of the resistance to bleeding in Examples 3 and 4 was made in the same manner as in the other examples except that whether bleeding occurred at a boundary area between the ink (3) and the yellow ink (1) in Example 1, and the boundary area between the ink (4) and the yellow ink (2) in Example 2 or not was determined.

According to the inks of the present invention and the ink-jet recording method making use of such inks, as described above, there can be provided prints free of bleeding and leathering, excellent in fixing ability and good in coloring ability even when conducting multi-color or full-color recording on plain paper.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded to the broadest interpretation so as to encompass all such modifications and equivalent structures and functions.

What is claimed is:

1. An ink comprising a recording agent and a liquid medium dispersing or dissolving the recording agent therein, wherein a finely particulate cellulose derivative is dispersed in the ink.

2. The ink according to claim 1, wherein the finely particulate cellulose derivative has a particle size distribution ranging from 0.01 $\mu$m to 10 $\mu$m.

3. The ink according to claim 1, wherein the finely particulate cellulose derivative is porous.

4. The ink according to claim 1, wherein the recording agent is a water-soluble dye.

5. The ink according to claim 1, wherein the recording agent is a pigment.

6. The ink according to claim 1, wherein the liquid medium comprises water and at least one water-soluble organic solvent.

7. An ink-jet recording method in which droplets of an ink are ejected out from an orifice in accordance with a recording signal to make a record on a recording material, wherein said ink used is the ink according to any one of claims 1 to 6.

8. The ink-jet recording method according to claim 7, wherein the droplets of the ink are ejected by applying thermal energy to the ink.

9. A recording unit comprising an ink container portion with an ink held therein and a head from which the ink is ejected in the form of ink droplets, wherein said ink is the ink according to any one of claims 1 to 6.

10. The recording unit according to claim 9, wherein the head comprises a head in which thermal energy is applied to the ink to eject its droplets.

11. An ink-jet recording apparatus comprising a recording head from which an ink is ejected in the form of ink droplets, an ink cartridge having an ink container portion with the ink held therein, and an ink feeder for feeding the ink from the ink cartridge to the recording head, wherein said ink is the ink according to any one of claims 1 to 6.

12. The ink-jet recording apparatus according to claim 11, wherein the head comprises a head in which thermal energy is applied to the ink to eject its droplets.

* * * * *

UNITED STATES PATENT AND TRADEMARK OFFICE
CERTIFICATE OF CORRECTION

PATENT NO. : 5,415,686
DATED : May 16, 1995
INVENTOR(S) : Yutaka Kurabayashi, et. al.

It is certified that error appears in the above-indentified patent and that said Letters Patent is hereby corrected as shown below: Title page, col. 2, line 7,
item [56] References Cited

FOREIGN PATENT DOCUMENTS

"3172362 7/1991 Japan" should read
--3-172362 7/1991 Japan--.

COLUMN 2

Line 19, "featbering." should read
--feathering.--.
Line 31, "featbering" should read
--feathering--.
Line 50, "featbering," should read
--feathering,--.

COLUMN 5

Line 21, "10" should read --10%--.

UNITED STATES PATENT AND TRADEMARK OFFICE
CERTIFICATE OF CORRECTION

PATENT NO. : 5,415,686
DATED : May 16, 1995
INVENTOR(S) : Yutaka Kurabayashi, et. al.

It is certified that error appears in the above-indentified patent and that said Letters Patent is hereby corrected as shown below:

COLUMN 8

Line 7, "component" should read
--components--.

COLUMN 10

Line 35, "featbering" should read
--feathering--.

COLUMN 11

Line 17, "leathering," should read
--feathering,--.

Signed and Sealed this

Twenty-sixth Day of September, 1995

Attest:

BRUCE LEHMAN

*Attesting Officer*     *Commissioner of Patents and Trademarks*